(12) United States Patent  (10) Patent No.: US 7,862,128 B2
Schlanger                    (45) Date of Patent:  Jan. 4, 2011

(54) VEHICLE WHEEL SPOKE CONNECTION

(76) Inventor: Raphael Schlanger, 128 Hulda Hill Rd., Wilton, CT (US) 06897

( * ) Notice: Subject to any disclaimer, the term of this patent is extended or adjusted under 35 U.S.C. 154(b) by 170 days.

(21) Appl. No.: 12/148,091

(22) Filed: Apr. 14, 2008

(65) Prior Publication Data

US 2008/0191544 A1    Aug. 14, 2008

Related U.S. Application Data

(63) Continuation-in-part of application No. 10/822,171, filed on Apr. 4, 2004, now Pat. No. 7,357,459, which is a continuation of application No. 09/893,166, filed on Jun. 27, 2001, now Pat. No. 6,899,401, which is a continuation-in-part of application No. 09/210,973, filed on Dec. 14, 1998, now Pat. No. 6,520,595.

(51) Int. Cl.
    *B60B 1/00*    (2006.01)
    *B60B 21/06*   (2006.01)
(52) U.S. Cl. .......................... 301/59; 301/58
(58) Field of Classification Search ............ 301/55, 301/58–59
    See application file for complete search history.

(56) References Cited

U.S. PATENT DOCUMENTS

| 1,824,888 | A  | * | 9/1931 | Hecht ......................... | 301/58 |
| 5,707,114 | A  | * | 1/1998 | Schlanger ................... | 301/58 |
| 6,520,595 | B1 | * | 2/2003 | Schlanger ................... | 301/59 |
| 6,899,401 | B2 | * | 5/2005 | Schlanger ................... | 301/59 |
| 7,357,459 | B2 | * | 4/2008 | Schlanger ................... | 301/59 |
| 2008/0191543 | A1 | * | 8/2008 | Saillet et al. ................ | 301/55 |

* cited by examiner

*Primary Examiner*—Jason R Bellinger

(57) ABSTRACT

A vehicle wheel, including an outer rim, a central hub with a central axle and an outer flange, a plurality of spokes extending between the rim and hub, a bracing element connected to one of the spokes, and a clamping element connected to the bracing element. The spokes have a span portion between the rim and hub. The spoke has a tensile axis of applied tensile load along the span portion, a sidewall surface, and a longitudinal axis along its length. The bracing element includes a portion of one of the rim and hub. The spoke is anchored to the clamping element in a clamped connection where the clamping element is clamped to one of the spokes by a clamping force. At least one of a first portion and a second portion of one of the spokes is joined to the clamping element by a deformed engagement.

32 Claims, 13 Drawing Sheets

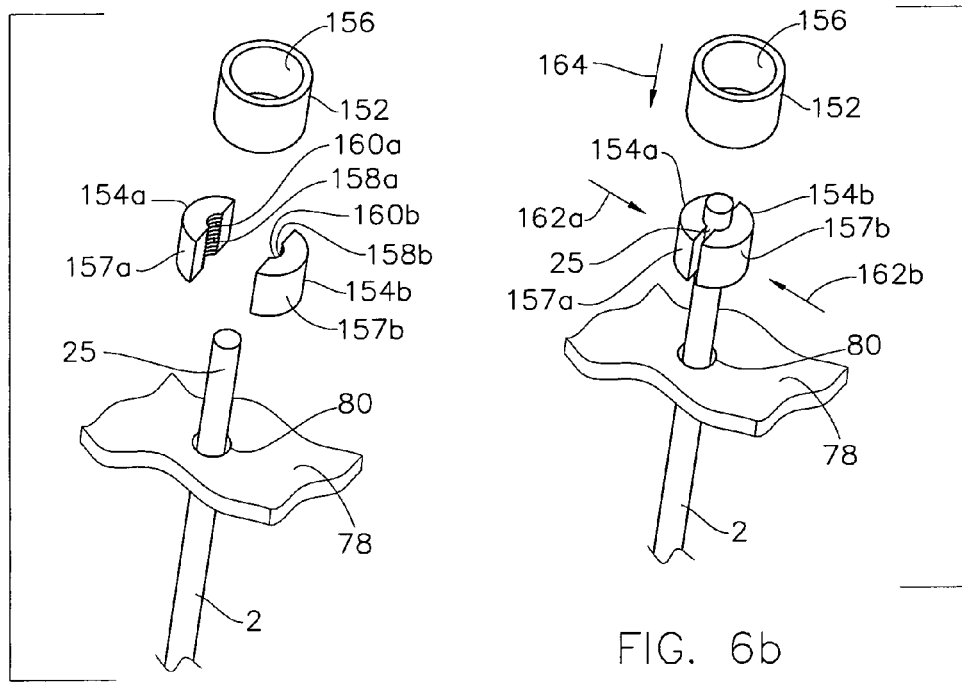
FIG. 6a
FIG. 6b
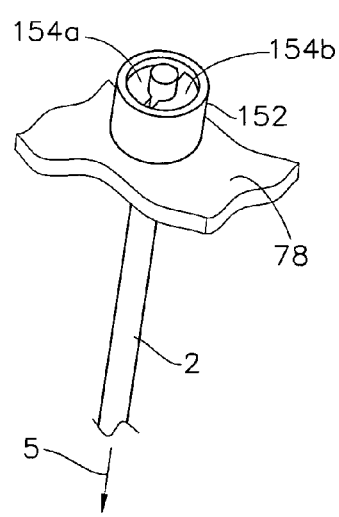
FIG. 6c
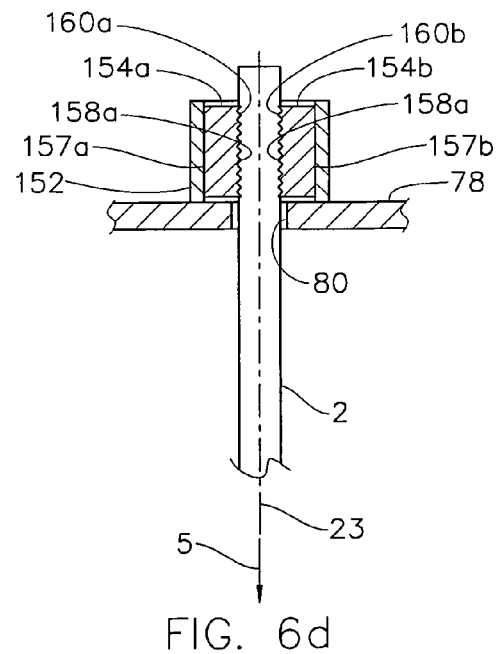
FIG. 6d

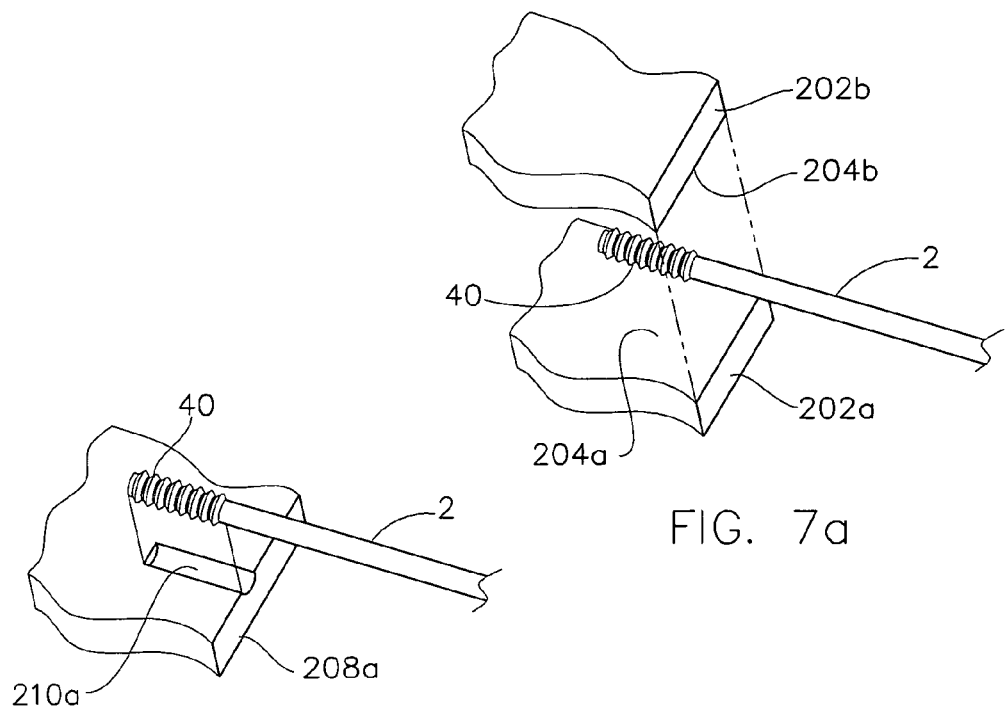
FIG. 7a
FIG. 7b
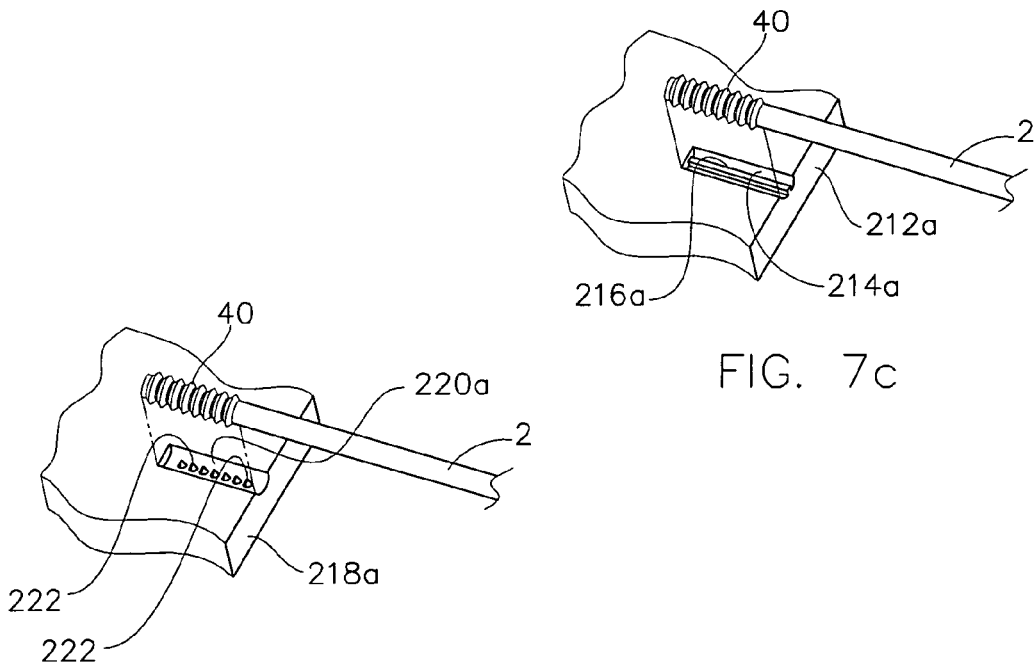
FIG. 7c
FIG. 7d

VEHICLE WHEEL SPOKE CONNECTION

CROSS REFERENCE TO RELATED APPLICATION

This application is a Continuation-In-Part of U.S. patent application Ser. No. 10/822,171 filed on Apr. 4, 2004, now U.S. Pat. No. 7,357,459, which issued on Apr. 15, 2008 and which in turn is a continuation of application Ser. No. 09/893,166, filed on Jun. 27, 2001, now U.S. Pat. No. 6,899,401, which issued on May 31, 2005, and which in turn is a continuation-in-part of application Ser. No. 09/210,973, filed on Dec. 14, 1998, now U.S. Pat. No. 6,520,595, which issued on Feb. 18, 2003.

BACKGROUND OF THE INVENTION (1) Field of the Invention

The present invention relates to an improved connection system for a vehicle wheel spokes.

(2) Description of the Related Art

Heretofore, the vast majority of bicycle wheels have been constructed using steel wire spokes that are connected, at their inner end, to a central hub component and, at their outer end, to a metallic rim hoop. The spokes are generally of steel construction while the hub and rim may be of aluminum or steel construction. The spokes, hub and rim are each formed as separate components that are then joined together with mechanical connections.

The manufacture of the hub component is an expensive process. Some hub shells are machined from aluminum billet while others are cast or forged and subsequently machined. This machining operation generally requires at least three machining setups: first the cylindrical portions of the hub are turned on lathe, second, the spoke holes in one hub flange are drilled in a rotary index operation, and third, the opposite hub flange is drilled in a separate rotary index operation as well. This multi-step machining process adds considerable expense to the manufacture of the hub shell component.

The tensile forces within the spoke create relatively high stresses at their connection points and these connection points must therefore be capable of withstanding these stresses. In the conventional spoke connection arrangement, stresses due to the spoke tension are concentrated over a relatively small region of the hub flange, namely the portion of the hub flange material that is radially outward from the spoke hole. This requires that the hub flange construction be based on expensive, higher strength materials and the use of more expensive forming processes, such as forging, rather than less costly processes, such as die casting or injection molding. Further, these stresses require that the flange be designed with robust thickness, thus adding weight to the wheel assembly.

The spokes of most conventional wheels are constructed of steel wire with a sharp "J" bend close to the headed end and adjacent to the point where they pass through the hole in the flange. The "J" bend region of the spoke is considerably weaker and less ductile due to the overstress of the material to achieve this bend. As would be expected, the "J" bend region is a common breakage point for spokes of conventional design. Spoke manufacturers have attempted to compensate for this shortcoming by thickening the wire in this region, but this solution results in considerable extra expense and weight.

It is often an objective to construct wheels with spokes that are flattened along their length to create a more aerodynamic cross-section profile. With a conventional hub flange, this creates a problem where the extra wide spoke cross section must pass through the round hole in the hub flange. The common assembly method, when flattened spokes are utilized, requires the slotting or notching of each individual spoke hole in the two hub flanges to allow the spoke to pass through. This additional operation adds considerable expense and weakens the hub flange as well.

With conventional wheels, the spoke is simply passed through the flange hole until the head of the spoke contacts the edge of this hole. The result is a loose clearance fit between the hub flange and the spoke, which permits the spoke to squirm and shift inside this hole. This undesirable movement results in wear at the flange and additional flex at the rim and also causes the wheel to come out of alignment (true) rather easily. Due to fabrication methods employed in conventional hub construction, it is very difficult to machine or otherwise create the details required to insure that the geometry of the hub flange conform to the spoke surface without any clearances. Such clearances allow flexure or movement under tensile loading of the spoke. Further, it is common practice for the builder of conventional wheels to manually bend the spokes in an attempt to conform the spoke to the hub flange and align the spoke in its direction toward the rim. This is obviously a compromise since, particularly in the case of bicycle wheels, the rim is of relatively light construction and any inconsistency in spoke tension or spoke flexure characteristics will cause the wheel to go out of true, or worse, will cause spoke breakage. When the tensile loads are not evenly shared by all of the spokes, the spokes with greater stresses will be more prone to breakage as will the portions of the rim and hub flange associated with these spokes.

In recent years, some attempt has been made to improve on this conventional wheel design, but the changes have been minor and still retain the same materials and basic configuration. Interestingly, many of these more modem designs are simply a rehash of inventions that are more than 80 years old. This is likely due to the fact that, aside from some more esoteric examples, these modem wheels rely on similar materials and construction techniques as those employed 80 years ago.

Accordingly, it is an objective of the present invention to overcome the forgoing disadvantages and provide an improved vehicle wheel with improved spoke attachment.

SUMMARY OF THE INVENTION

In accordance with the present invention, it has now been found that the forgoing objects and advantages may be readily obtained.

A wheel of the present invention comprises an outer rim, a central hub with a central axle and an outer flange, a plurality of spokes extending between the rim and hub, a bracing element connected to at least one of the spokes, and a clamping element connected to the bracing element. The spokes have a first portion connected to the rim and a second portion opposed to the first portion and connected to the hub and a span portion between the rim and hub. The spoke has a tensile axis of applied tensile load along the span portion, a sidewall surface, and a longitudinal axis along its length. The bracing element includes at least a portion of at least one of said rim and hub. The spoke is anchored to the clamping element in a clamped connection where the clamping element is clamped to at least one of the spokes by a clamping force, including a clamped interface between the spoke and the clamping element. At least one of the first portion and said second portion of at least one of the spokes is joined to the clamping element by means of a deformed engagement where at least one of (1) the clamping element is deformed by the spoke and (2) the spoke is deformed by the clamping element.

The present invention obtains many advantages. It is an advantage of the present invention is the reduction in cost through the ability to utilize inexpensive and efficient manufacturing techniques in the production of component parts.

The hub and hub flange of the present invention may be produced using "net shape" molding techniques that reduce or eliminate the need for expensive machining operations. Since this design is well suited to such molding or casting operations, the desired hub geometry may be produced with few, if any, secondary-machining operations. In the case where subsequent machining is required, far fewer of these costly operations are anticipated than if the hub were produced from a billet or a forging. Further, in such a "net shape" forming operation, the amount of material waste is greatly reduced, particularly when compared to a part that is fully machined from billet.

While some existing wheel designs terminate the spoke in a pre-threaded hole in the hub flange, these tapping and threading operations are time consuming and expensive operations. The present invention allows the spoke to be anchored to a straight smooth cavity located in the rim or hub. machining or molding a straight and smooth cavity is far less expensive than providing a pre-threaded hole.

The present invention describes a longitudinal engagement between the spoke and the hub flange or rim. Such a longitudinal engagement increases the contact area and reduces the contact stress, making such polymer materials the preferred choice for forming the rim and/or hub flange.

Since the spoke tension stresses of the present invention are distributed over a wider region of the hub flange interface, stresses are reduced within the hub flange material. Thus the strength requirements for the hub flange material are reduced and lower performance materials may be utilized, further reducing the cost as compared with conventional hubs. For example, the hub flange of the present invention may now be formed from relatively inexpensive polymer resins. These materials also lend themselves to lower-cost forming operations such as plastic injection molding. If a metallic hub flange is deemed necessary, high strength billet alloys are no longer required. Lower-strength metal casting alloys, which may be formed using a casting process such as die-casting, will likely have sufficient strength.

The present invention is uniquely applicable to arrangements wherein the hub flange and/or rim are formed from polymeric materials. Many of these materials, especially engineering polymers, exhibit good strength characteristics and are relatively inexpensive and easy to mold. Heretofore, these materials have not been used successfully applied in hub flange and rim applications because they do not exhibit sufficient hardness to withstand the high contact stresses associated with conventional spoke attachment technology. The present invention describes a longitudinal engagement between the spoke and the hub flange or rim. Such a longitudinal engagement increases the contact area and reduces the contact stress, making such polymer materials the preferred choice for forming the rim and/or hub flange.

Also, fiber reinforced injection molding compounds may now be utilized in the present invention. With these high strength composite polymers, the injection molding process permits the fibers to attain a generally random orientation within the matrix. This is a significant benefit that would not apply if the hub were machined from a fiber reinforced plastic billet. Fiber reinforced billet is normally produced by an extrusion process where the fibers become highly aligned in the direction of extrusion. Thus, a hub shell machined from such a billet would have relatively low strength perpendicular to the direction of extrusion.

Some of the embodiments of the present invention also illustrate the ease with which duplex spokes may be incorporated into the present invention. These duplex spokes create the equivalent of two individual spokes using only a single series of manufacturing operations and are thus less expensive to produce.

The spokes of a conventional wheel are each produced as single components and require very specific and accurate geometry to mate with the conventional hub flange. However, the spokes of the present invention are easier to produce. In many cases, manufacturing operations such as the bending or heading of the spokes are eliminated, thereby reducing the expense.

Since the cavities of the present invention may be formed in a mold, rather than drilled, the cross section of the cavity may be produced in any shape desired. This is particularly useful in adapting the cavity to flattened aerodynamic spokes.

An additional advantage of the present invention is the production of a wheel that is light in weight and high in strength and reliability.

In an effort to enhance the performance of the bicycle, designers have continually aimed toward reducing the weight of its components while maintaining the strength and reliability that the marketplace requires. This is particularly true of the rotating components, such as the wheel, since any weight reduction reduces the rotational inertia as well as the static mass of the bicycle.

Due to its relaxed strength requirements, the present invention permits the use of lightweight materials to produce the hub flange component. Thus, materials such as polymers, reinforced polymers, magnesium, aluminum, among others, may now be used to construct the hub flange, saving precious weight.

Additionally, since the present invention permits the use of net-shape molding operations, the hub flange may now be produced to include far more intricate geometry than would be realistic for a hub that is machined from billet. This allows the designer to eliminate material from the hub flange in the locations where it is not required, further saving precious weight.

Many of the embodiments of the present invention illustrate the use of additional preformed components incorporated within the overmolding hub flange material. This allows additional components such as a preformed reinforcement or a preformed intermediate connection member to be incorporated into the design. Thus, the hub shell may be of hybrid construction and composed of several components, where each component is made from a material that particularly suits its function. For example, this allows the designer to locate components made from higher strength materials specifically where they are needed to achieve the greatest structural efficiency with the minimum weight.

As illustrated in many of the embodiments of the present invention, the sharp J-bend of traditional spokes may eliminated with the present invention, thereby eliminating a region where the spoke material is highly stressed and prone to failure.

The engaged spoke connection of the present invention results in a hub flange or rim that is conformed or matched to the geometry of the spoke to support the connection therebetween. Therefore the spoke tensile loads produce little or no relative movement or squirm between the spoke and the hub flange or rim. The exposed portion of the spoke extends to its connection at the rim in a straight and aligned direction. Thus spoke tensile forces may now be evenly shared among the spokes of the wheel, resulting in a stronger, more reliable wheel that is less prone to broken or worn components and is far more effective at maintaining trueness and rim alignment.

Further objects and advantages of my invention will become apparent from considering the drawings and ensuing description.

BRIEF DESCRIPTION OF THE DRAWINGS

The present invention will be readily understandable from a consideration of the accompanying drawings, wherein:

FIG. 2b is a cross-section view of the prior art bicycle wheel as seen generally in the direction 15-15 of FIG. 2a;

FIG. 3b is a radial cross-section exploded view of the hub shell assembly of the embodiment of FIG. 3a;

FIG. 3c is a radial cross-section assembled view of the hub shell assembly of the embodiment of FIG. 3a;

FIG. 4b is a radial cross-section exploded view of the hub shell assembly of the embodiment of FIG. 4a;

FIG. 4c is a radial cross-section assembled view of the hub shell assembly of the embodiment of FIG. 4a;

FIG. 6a is an exploded perspective view of a fourth embodiment of the present invention, showing a spoke connection prior to assembly, including two clamping elements and a retaining sleeve;

FIG. 6b is a perspective view of the embodiment of FIG. 6a, showing the partially assembled spoke connection;

FIG. 6c is a perspective view of the embodiment of FIG. 6a, showing the fully assembled spoke connection;

FIG. 6d is a radial cross section view of the embodiment of FIG. 6a, showing the fully assembled spoke connection;

FIG. 7a is an exploded perspective view of a fifth embodiment of the present invention, showing a spoke connection prior to assembly, including two generally flat clamping elements;

FIG. 7b is an exploded perspective view of a sixth embodiment of the present invention, showing a spoke connection prior to assembly, including a clamping element with an open cavity;

FIG. 7c is an exploded perspective view of a seventh embodiment of the present invention, showing a spoke connection prior to assembly, including a clamping element with a raised rib;

FIG. 7d is an exploded perspective view of an eighth embodiment of the present invention, showing a spoke connection prior to assembly, including a clamping element with a series of raised bumps;

DETAILED DESCRIPTION OF THE INVENTION

Figure 1:
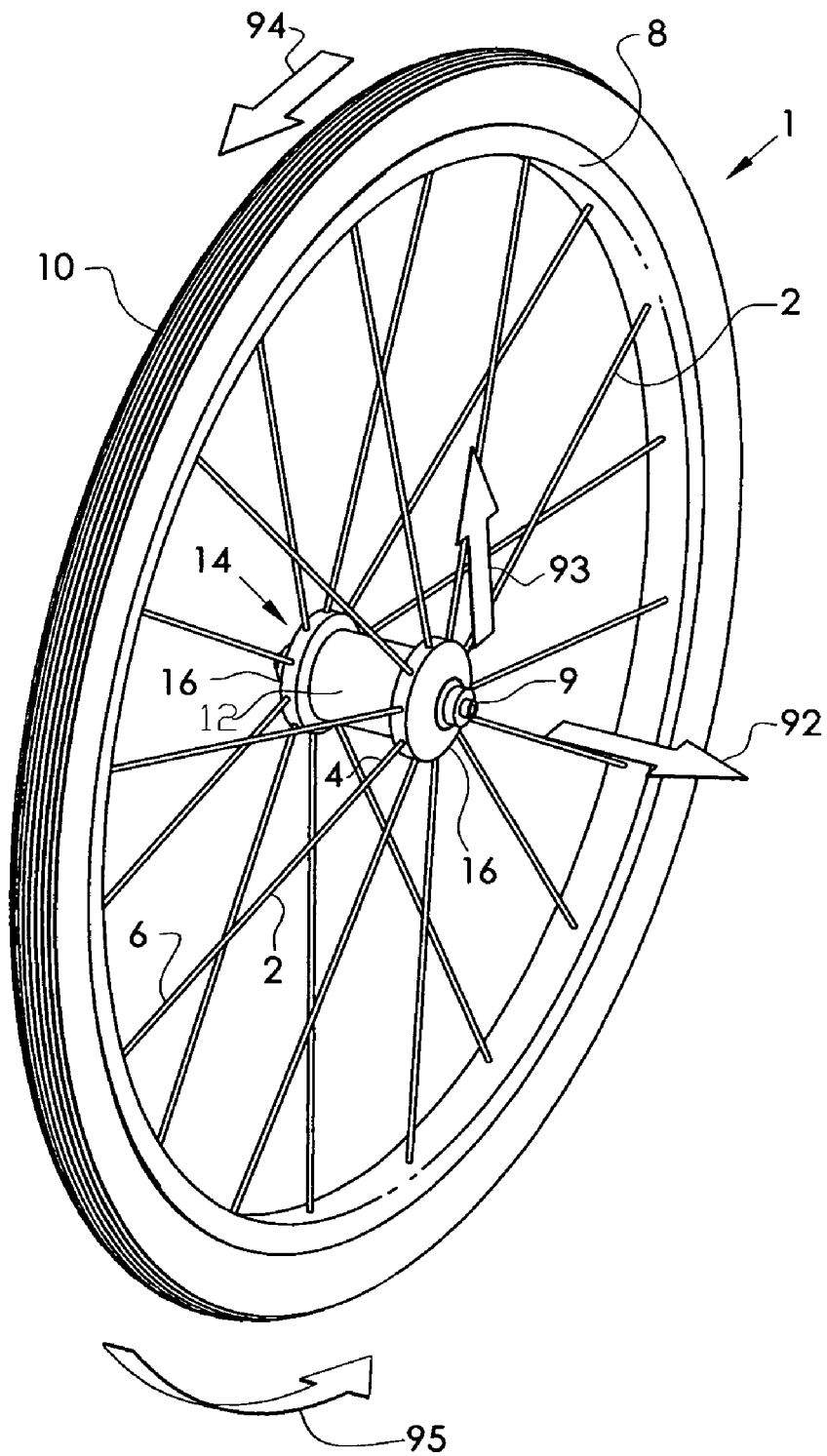
FIG. 1 is a perspective view schematically illustrating the general configuration of a prior art vehicle wheel as applied to a bicycle wheel.

The present invention comprises a vehicle wheel spoke having an end portion and a cross-section thereof, a bracing element, and a tensile axis of applied tensile load along the spoke. The spoke is connected to at least one bracing element via a clamped connection between the spoke and either the bracing element or an intermediate element.

A spoke is a generally long slender tensile element, with a length greater than its cross sectional width, and with a longitudinal axis extending generally along its length. The spoke includes sidewall surface(s) that extend generally along its length. As such, the longitudinal axis is generally parallel to the sidewall surface. In most of the embodiments of the present invention, the spoke is capable of supporting tension, otherwise known as positive tensile loading, along its length. However, the spoke may alternatively support compression, otherwise known as negative tensile loading, along its length, where the spoke provides columnar support between two bracing elements. The tensile axis is the axis along which tensile loads are applied to the tensile element, and is commonly collinear with the longitudinal axis, especially in the region of the structural span of the spoke. However, if the spoke is bent or redirected, then the longitudinal axis will deviate from the tensile axis. For the purposes of explanation herein, the term "longitudinal axis" is generally interchangeable with the term "tensile axis", unless otherwise noted.

A bracing element is one that resists or braces against all or part of the load of a tensile element. In other words, in order for a tensile element to maintain its tension (or compression) and remain a generally static structure, it must have a resisting or bracing element to bear against. Thus, the tensile element is generally anchored to two bracing elements and the tensile element thereby serves to connect the two bracing elements to each other. In an example where the tensile element is generally held in tension, such as the spoke of a tension-spoke vehicle wheel, a first bracing element could be the hub flange and a second bracing element could be the outer rim hoop. Similarly, in the case where the tensile element is generally held in compression, such as the spoke of a compression-spoke vehicle wheel, the bracing element is that element which the tensile element is pushed against.

The clamped connection of the present invention may be utilized to provide a direct connection between the tensile element and a bracing element. Alternatively, the clamped connection may be utilized to provide a connection with a connecting element that is, in turn, connected to the bracing element. Further, an auxiliary or intermediate element may be incorporated into the design to facilitate the connection between the tensile element and the bracing element.

In the discussions herein, the term "coupling" identifies a connecting element that serves to provide a structural connection between the two tensile elements, thus permitting tensile loads to be transmitted from one tensile element to another. The term "termination" or "anchor" identifies a connecting element that serves to provide a means to connect the tensile element (i.e. spoke), either directly or indirectly, to a bracing element (i.e. the hub or rim), to which the tensile element is intended to be anchored.

In a clamped connection, the spoke is generally clamped or sandwiched between two or more opposing surfaces of a clamping element to provide anchoring of the spoke. The clamping element is connected to (or may be integral with) a bracing element. Since these opposing surfaces are forcibly pressed against the sidewall surface of the spoke, the friction between these mating surfaces will frictionally lock or grip, creating a firm connection between the spoke and the bracing element.

Further, as these opposing surfaces are pressed against the surface of the spoke, some surface deformation may occur at the clamped interface where the surface of the clamping element and the surface of the spoke contact each other. Outside of the clamped interface, the clamping element generally retains its form. The surface of the clamping element may emboss the surface of the spoke or a surface of the spoke may emboss the surface of the clamping element or both may emboss each other. This embossing phenomenon has the added benefit of providing a certain degree of overlying mechanical interlock between the spoke and bracing element that serves to further augment the firm connection between the spoke and the bracing element. Since the clamping element may emboss or deform the spoke and or the spoke may deform or emboss the clamping element, the connection may be termed a "deformed connection". In such a deformed connection, one or both of the mating surfaces are deformed to augment the connection.

In the case where embossing occurs, it is often preferable to control which surface is embossed. As a general rule, a harder and/or stiffer surface will emboss a softer and/or more pliable surface as the two surfaces are pressed together. The harder surface of the embossing element will maintain its geometry while the mating softer surface of the embossed element will deform to conform to the harder surface geometry. Thus, it is possible to predict the deformation or embossed geometry by selectively controlling the relative hardness of the mating surfaces.

Further, by controlling the geometry of the harder surface, it is possible to optimize or otherwise control the level and nature of the interlock engagement provided by the embossed interface between the two mating surfaces. Thus, it may be preferable to create a pinched or impinged region in the embossed element alongside an adjacent relieved or un-impinged region, where the relieved region provides an overlying engagement with the mating embossing element. It may be further preferable to provide embossing geometry that includes a series of more deeply embossed or pinched regions interspersed with relieved regions therebetween to create a multiplicity of these overlying engagements, which may provide a more solid connection between the spoke and the bracing element.

The spoke has a sidewall surface(s) that are generally parallel to the longitudinal axis and an end face that is generally perpendicular to the sidewall surface. With a slender spoke, the sidewall tends to have far greater available surface area than its end face. It is often most advantageous to provide a clamped interface with a portion of this sidewall surface, since this provides a broad surface area of interface. Since a greater surface area tends to provide a more robust connection, it is often preferable to provide a clamped interface that extends longitudinally along the sidewall surface by at least twice the cross sectional thickness of the spoke. This is in contrast to the conventional arrangement that focuses these loads on a small point of contact as with conventional prior art wheel assemblies.

It may also be seen that it is often preferable to apply clamping pressure in a direction perpendicular to the sidewall surface, as this is the most effective direction for a clamped engagement with the sidewall surface. This preference is reflected in a majority of the embodiments of the present invention.

The clamped engagement described herein is a longitudinal engagement that acts along the longitudinal axis of the spoke 2. This longitudinal engagement distributes the spoke tension loads and the associated stresses over a longitudinal length, rather than focusing these loads at a small point of contact, as with conventional prior art wheel assemblies. It may be termed that a longitudinal engagement includes a continuous engagement interface or at least two engagement interface locations that are longitudinally spaced along the longitudinal axis of the spoke. It is generally desirable that the longitudinal length of such an engagement be greater than the cross-sectional thickness of the spoke to create an effective engagement. Obviously, increasing the length of engagement will increase the load carrying capacity of the connection.

Since a longitudinal engagement may reduce the contact stresses at the interface where the bracing element and the spoke are connected, this type of engagement is particularly applicable to bracing elements and/or spokes of polymer or reinforced polymer materials. This is particularly advantageous, since these materials tend to have high strength and light weight. However, heretofore these materials have been difficult to apply to conventional spoke connection systems that are generally focused on construction based on metallic materials.

In order to take advantage of the lightweight and high strength of the high-performance fibers mentioned hereinabove, it may be preferable to incorporate these material(s) in the spoke. These materials tend to be anisotropic and have greater strength along the direction of the fiber. Thus it is preferable that these fibers are aligned to be parallel to the tensile axis. It is also preferable that these reinforcement fibers be encapsulated in a matrix. While short or discontinuous fibers often provide significant reinforcement to the matrix material, it is preferable that the fibers be as long as possible to provide the greatest overlap with adjacent fibers. The utilization of continuous fibers that extend generally along the length of the spoke provides the highest mechanical properties. It is further preferable that the fibers extend along the tensile axis to overlap within the region of the clamped interface.

FIG. 1 describes the basic configuration of an exemplary vehicle wheel, in particular, a bicycle wheel 1, as well as a description of the direction conventions used throughout this disclosure. The hub shell 14 is rotatable about the axle 9 and includes at least two axially spaced hub flanges 16, each of which include a means for connecting with the spokes 2. The hub flange 16 may be contiguous with the hub shell 14 or it may be separately formed and assembled to the hub body 12 portion of the hub shell 14. The spokes 2 are affixed to the hub flange 16 at their first end 4 and extend to attach the rim 8 at their second end 6. The tire 10 is fitted to the outer periphery of the rim 8. The axial direction 92 is any direction parallel with the axis of the axle 9. The radial direction 93 is a direction generally perpendicular to the axial direction 92 and extending generally from the centerline of the axle 9 radially outwardly toward the rim 8. The tangential direction 94 is a direction generally tangent to the rim at a given radius. The circumferential direction 95 is a cylindrical vector that wraps around the axial direction 92 axis at a given radius. The wheel of FIG. 1 is generic and may be of tension-spoke or compression-spoke design. A radial plane is a plane defined by an axial vector and a radial vector. An axial plane is defined by two radial vector at a given axial intercept.

While it is most common for the hub shell 14 to rotate about a fixed axle 9, there are some cases where it is desirable to permit the axle 9 to be fixed with the wheel 1 such as the case where the wheel 1 is driven by the axle 9.

For the purposes of using conventional terminology, the term "hub flange" is used herein to describe a region of the hub shell 14 to which the spokes 2 are joined. While the surface of the hub flange may be raised and flange-like in comparison to other surfaces of the hub shell 14, this is not a requirement for the present invention and the hub flange 16 may alternatively be flush or recessed relative to other hub shell surfaces.

It may be easiest to mold or otherwise form or fabricate the individual hub flanges 16 separately and then assemble these hub flanges 16, along with other components as required, such as the body portion 12, to create a complete hub shell 14. This hub shell 14 assembly may be permanent or else it may be removably assembled, allowing the hub flange 16 to be disassembled from the other portions of the hub shell 14 for servicing in the field. However, it is also anticipated that the hub shell 14, including the body portion 12 and a multiple of hub flanges 16, may be molded or formed together as a unit.

As is well known in the art, a wheel 1 may be of tension-spoke construction, where the central hub hangs in tension by the spokes from the rim portion directly above, or it may be of compression-spoke construction, where the hub is supported by compressing the spoke directly beneath it. Since the present invention may be directed toward bicycle wheels and since the tension-spoke wheel is generally a more efficient structure than compression-spoke wheel, most of the discussion herein is focused with an eye toward tension-spoke wheel construction. However, it is anticipated that most, if not all, of the embodiments of the present invention may be applied to compression-spoke wheel construction as well. For a tension-spoke wheel, it is preferable that the wheel includes at least two hub flanges that are axially spaced on either side of the rim or, more specifically, the spoke attachment points at the rim. Thus the spokes fixed to opposite hub flanges will converge as they extend to the rim as illustrated in FIG. 2*b*. Additionally, a tension-spoke wheel will usually be pretensioned during assembly to create a pretensioned structure of balanced spoke tension that allows the axle loads to be distributed among several, if not all, of the spokes of the wheel. It is this ability to share the stresses among its spokes that helps to make the tension-spoke wheel the highly efficient structure that it is. For a compression-spoke wheel, it is often preferable to employ at least two axially spaced hub flanges, however, in the case where the spokes have sufficient bending stiffness to support the requisite lateral loads, only a single hub flange may be employed.

Figure 2A:
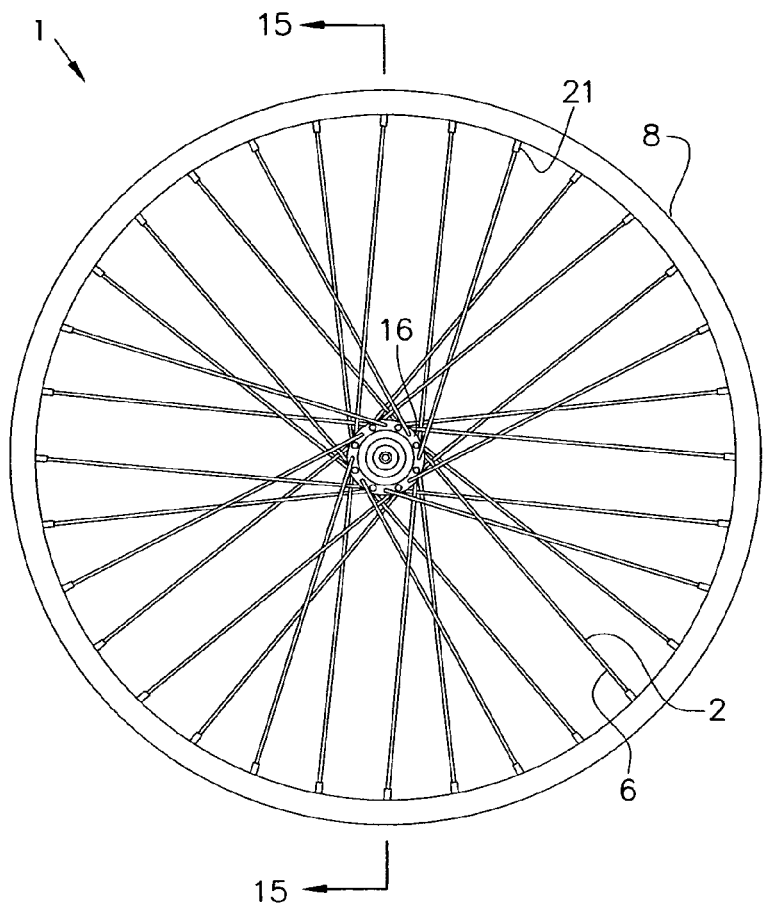
FIG. 2a is an axial plan view illustrating a prior art bicycle wheel.
Figure 2B:
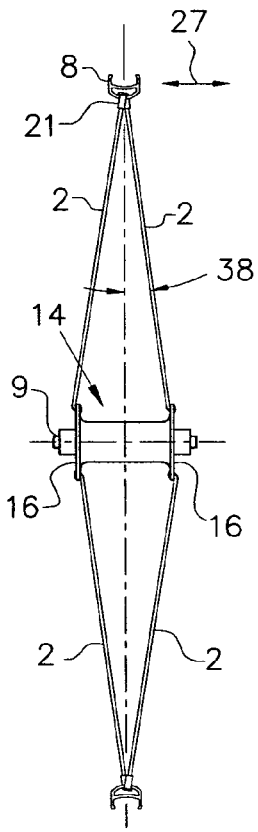
Figure 2C:
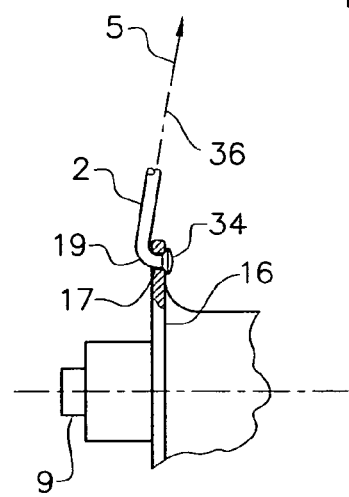
FIG. 2c is a fragmentary view detailing the view illustrated in FIG. 2b where the hub flange is shown in a partial cross-section to illustrate the connection with the spoke.

FIGS. 2*a*, 2*b* and 2*c* describe the current technology in conventional bicycle wheels that most cyclists are familiar with. This prior art design includes a rim 8, a hub shell 14 and a plurality of spokes 2. The hub shell 14 is rotatable about the axle 9 and includes a pair of axially spaced hub flanges 16. The wheel is assembled by first threading each individual spoke 2 through an axial hole 17 in the hub flange 16 until the j-bend 19 is hooked within the hole 17. The spoke 2 is then pivoted to extend in a generally radial direction toward the rim 8. The enlarged portion 34 or "head" of the spoke 2 prevents the spoke 2 from pulling through the hole 17 in the hub flange 16 due to spoke tension force 5. The second end 6 of each spoke 2 is then fixed to the rim 8 via spoke nipples 21. Tightening the threaded engagement between the spoke nipple 21 and the spoke 2 serves to effectively shorten the length of the spoke 2. Thus, as the nipples 21 are threadably tightened, the spokes are drawn up tight and a degree of spoke tension force 5 is induced in the spoke 2. By selectively adjusting this threaded engagement, the spoke tension force 5 may be adjusted to align the trueness of the rim 8. The spoke tension force 5 is resisted by circumferential compression of the rim 8 and it is this balance of forces that imparts efficient structural integrity to the bicycle wheel 1. Also shown in FIG. 2*b* is bracing angle 38 between the radial centerline plane of the rim 8 and the tensile axis 36 of the spokes 2. As this bracing angle 38 is increased, the lateral stiffness (i.e. stiffness in the axial direction) of the wheel 1 is also increased.

Figure 3A:
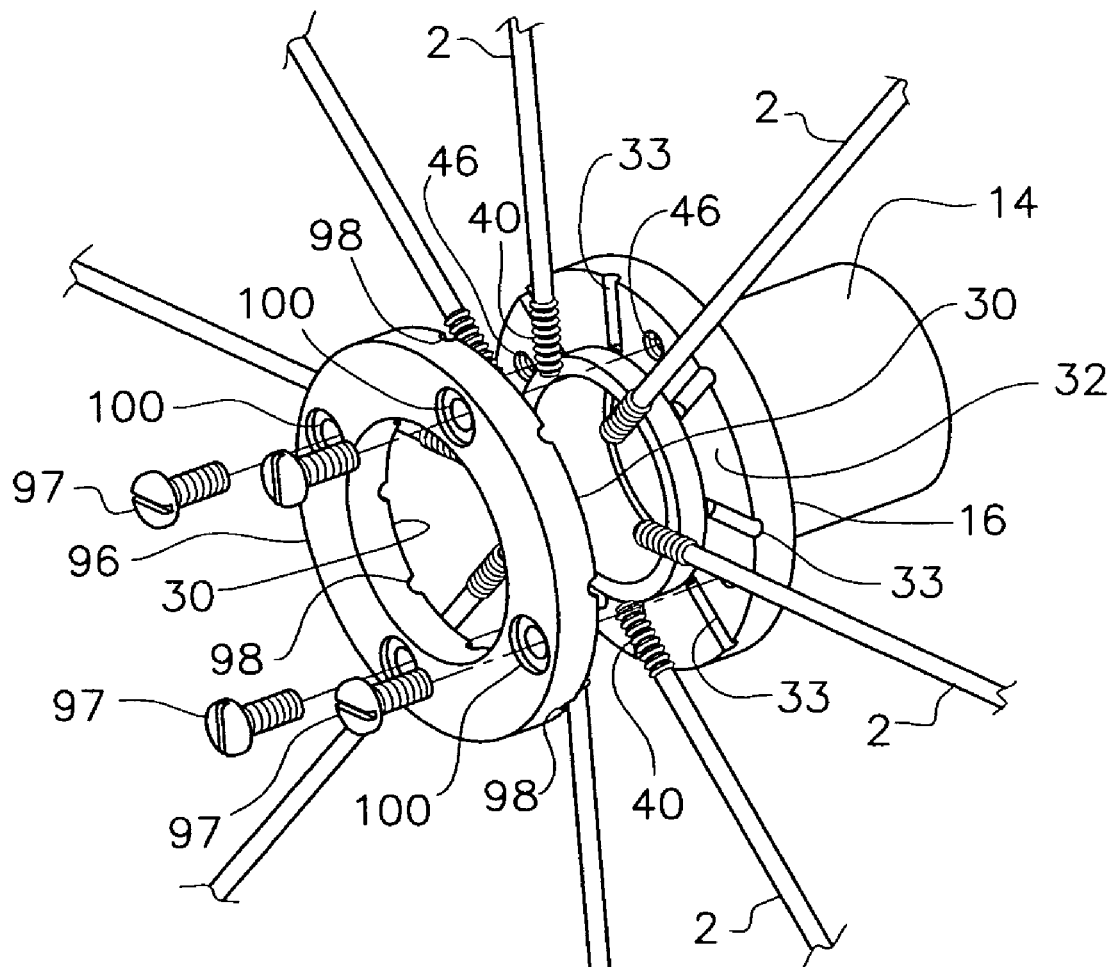
FIG. 3a is an exploded perspective view of a partial hub shell assembly of an embodiment of the present invention, showing a spoke with a configured surface prior to assembly with the hub flange, including a clamping member.
Figure 3B:
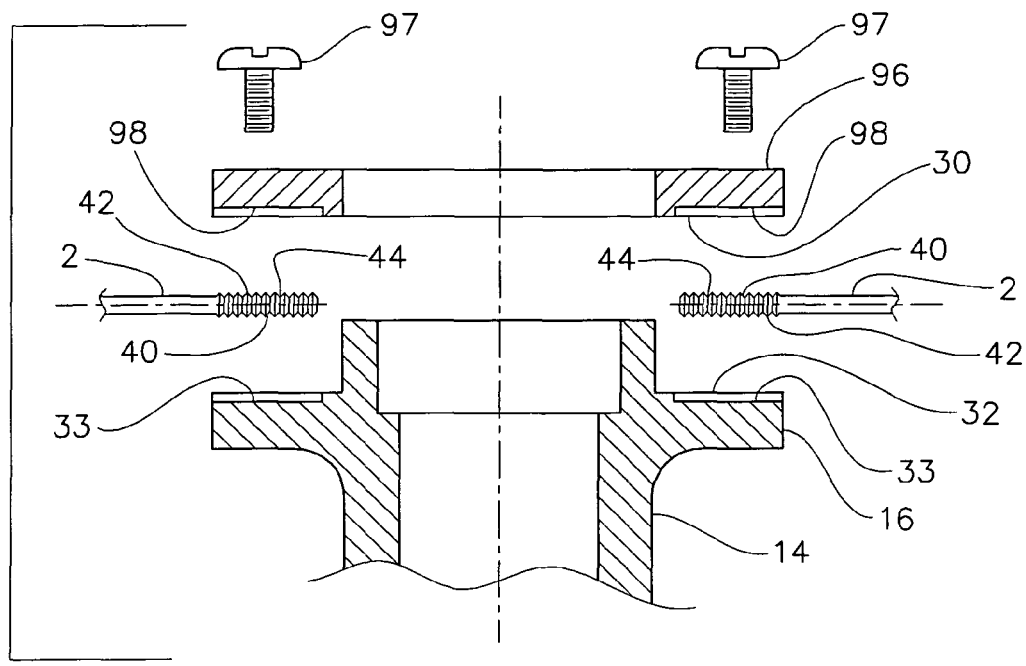
Figure 3C:
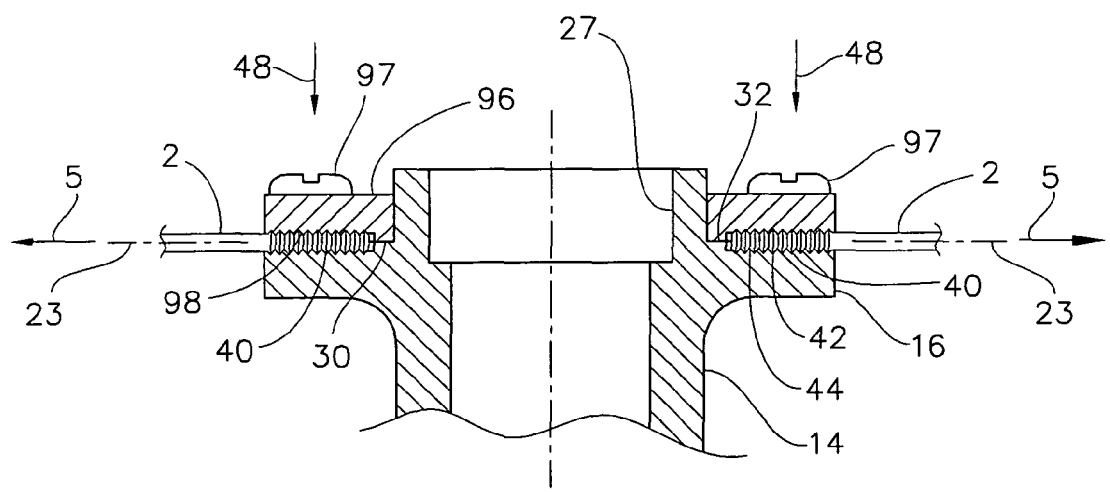

The embodiment of FIGS. 3*a-c* utilizes recesses or cavities 33 in the hub flange 16 to accept the spokes. In general, a cavity is bounded by sidewalls, which are the walls that are generally parallel to the longitudinal axis of the cavity, and two opposing ends which are the walls that are generally perpendicular to the longitudinal axis of the cavity. An open cavity 33, as shown in FIGS. 3*a-c*, is open along at least a portion of its sidewall and its distal end. Although the spoke 2 may still be inserted through the open end of cavity 33 in a direction parallel to the longitudinal axis of the cavity, the open cavity arrangement also allows the spoke 2 to alternatively be inserted in a direction perpendicular to the longitudinal axis of the cavity and through the open sidewall of the open cavity 33.

FIGS. 3*a-c* describes an embodiment that includes a clamping member 96 to sandwich and clamp the spoke 2 between the hub flange 16 and the clamping member 96. Hub shell 14 includes a hub flange 16 and a bearing bore 27 to facilitate mounting of a bearing (not shown) and axle (not shown). Hub flange 16 serves as both a bracing element and a clamping element and includes internally threaded holes 46 and open cavities 33 in its face 32 for engagement with configured or knurled portions 40 of spokes 2. Clamping member 96 includes open cavities 98 in its corresponding face 30 that are aligned to be opposed to cavities 33 of the hub flange 16. Spoke 2 includes a knurled portion 40 as shown. On assembly, spokes 2 are first positioned such that knurled portions 40 are nested in their corresponding cavities 33. Clamping member 96 is then assembled to axially sandwich the knurled portions 40 of spokes 2, with the knurled portions nested also in their corresponding cavities 98. Screw 97 is passed through clearance hole 100 and threadably engaged with mating hole 46 of the hub flange 16. When the screw 97 is threadably tightened into hole 46, with the underside of its screw head pressed against the clamping member 96, the clamping member is driven axially toward the hub flange 16, in a direction generally perpendicular to the sidewall of the spoke 2, to provide clamping force 48 to sandwich the knurled portions 40 of spokes 2. The knurled portions 40 are thus pressed between cavities 98 and 33, embossing and deforming cavities 98 and 33 to at least partially conform to knurled surface 40. A firm deformed engagement connection between the hub flange 16 and the spoke 2 is thus achieved. FIGS. 3a and 3b show the assembly of the spoke 2, hub flange 16 and clamping member 96 in exploded view prior to assembly. FIG. 3c shows the spoke 2 as clamped and engaged to the hub flange 16 and clamping member 96, with cavities 33 and 98 embossed to engage the knurled surface 40. The spoke 2 is now firmly anchored to the hub flange 16 and is capable of resisting spoke tension forces 5. The clamping member 96 is firmly engaged and retained to the hub flange 16 by the screws 97, which also serve to maintain their clamped connection with the spokes 2. It may be viewed that hub flange 16 and clamping member 96 may both be considered to be clamping elements that sandwich the spoke 2.

In this embodiment, a wide range of materials may be utilized to form the hub flange 16, clamping member 96, and spoke 2. Since this embodiment shows the spoke as the embossing element and the hub flange and clamping member 96 as embossed elements, it is preferable that the spoke 2 be of a harder and/or stiffer material than the mating hub flange 16 and clamping member 96. In a preferred arrangement, the hub flange 16 and clamping member 96 are both made of fiber-reinforced polymeric material and the spoke 2 is made of harder metallic material, such as stainless steel. Reinforced polymeric material, such as a Polyamide reinforced with glass or carbon fibers possess high structural strength and may be easily and economically molded in conventional processes. Stainless steel generally has high tensile strength and is commonly used as spoke material and thus may also be economically produced.

It should be understood that, the knurled surface 40 constitutes a series of raised ribs 42 interspersed with correspondingly relieved portions 44 therebetween along the longitudinal axis 23 of the spoke 2. As these raised ribs 42 are pressed against cavities 33 and 98, they impart localized regions of high contact stress in the mating cavity. This contact stress causes the mating cavity (33 and 98) to yield and become deformed or embossed to conform to these raised ribs 42. This contact stress may be within the elastic range of the material surrounding the embossed cavity, in which case, the associated deformation constitutes elastic deformation. Otherwise, this contact stress may be above the elastic range of the material surrounding the embossed cavity, in which case, the associated deformation constitutes plastic deformation. In most cases, the embossing deformation will be a combination of both plastic and elastic deformation. The elastic portion of the deformation will serve to maintain springback of the system and insure that the clamped connection remains tight and without free-play or looseness. Since this embodiment shows a clamped engagement that is embossed to include a series of longitudinally spaced engagement points associated with raised ribs 42, it may be considered a longitudinal engagement.

Note that the depth of the cavities 33 and 98 may be controlled such that, upon tightening of the screws 97, faces 32 and 33 contact each other, thereby providing a depth-stop to limit the depth of embossing between the configured surface 40 and the cavities 33 and 98. Alternatively, the depth of cavities 33 and 98 may be designed to be shallower, such that faces 32 and 33 do not meet upon assembly. In this case, the depth of embossing is not limited and further tightening of the screws 97 will continue to provide further clamping force.

It should be noted that open cavities 33 constitute recesses with relatively smooth surfaces. It is understood that face 32 and face 30 could alternatively be a smooth flat surfaces without their respective cavities 33 and 98. In such a case, when faces 32 and 30 are pressed against the spoke 2, they would be embossed to at least partially conform to the configured surface 40 of the spoke and may provide the requisite anchoring. However, while these cavities 33 and 98 may not be required to effect a firm connection between the spoke 2 and the hub flange 16, it is preferred that the cavities are included. The cavities 33 and 98 help to provide a well-defined location for alignment of the spoke 2 during assembly. Further, these cavities provide a surface that partially wraps around the surface of the spoke to provide more closely matched surface interface. This reduces the clamping force and associated stress on the hub flange and clamping member, while still maintaining the requisite anchoring to resist spoke tension forces 5.

It should also be noted that screws 97, used to create the clamping force, are able to be disassembled and re-assembled from the hub flange 16. As such, the entire clamped assembly may be may be disassembled and re-assembled as well, allowing the wheel to be serviced or repaired. Disassembly is performed by reversing the assembly process described above.

It should also be noted that, while screws 97 are shown here to provide the requisite clamping force to sandwich the spoke 2 between the hub flange 16 and the clamping member 96, this is merely a representative clamping method and alternate clamping methods are envisioned. For example, the assembly may be designed such that the hub flange 16 and clamping member 96 are first pressed by an external force and then retained in that pressed position by a retaining means, such as a retaining clip or a retaining sleeve. Another exemplary alternative may involve preloaded springs to maintain clamping force. Still further, a wide range of other alternate clamping methods may also be utilized.

While the cavities 33 and 98 are shown to have generally smooth surfaces, it is further envisioned that cavities 33 and/or cavities 98 include a configured surface intended to mate with the configured surface 40 of the spoke 2. When the cavities 33 and 98 are forced together to clamp the spoke 2, the configured surface(s) would be further distorted to conform to the configured surface 40 to result in further matching of surfaces between cavity and spoke.

Figure 4A:
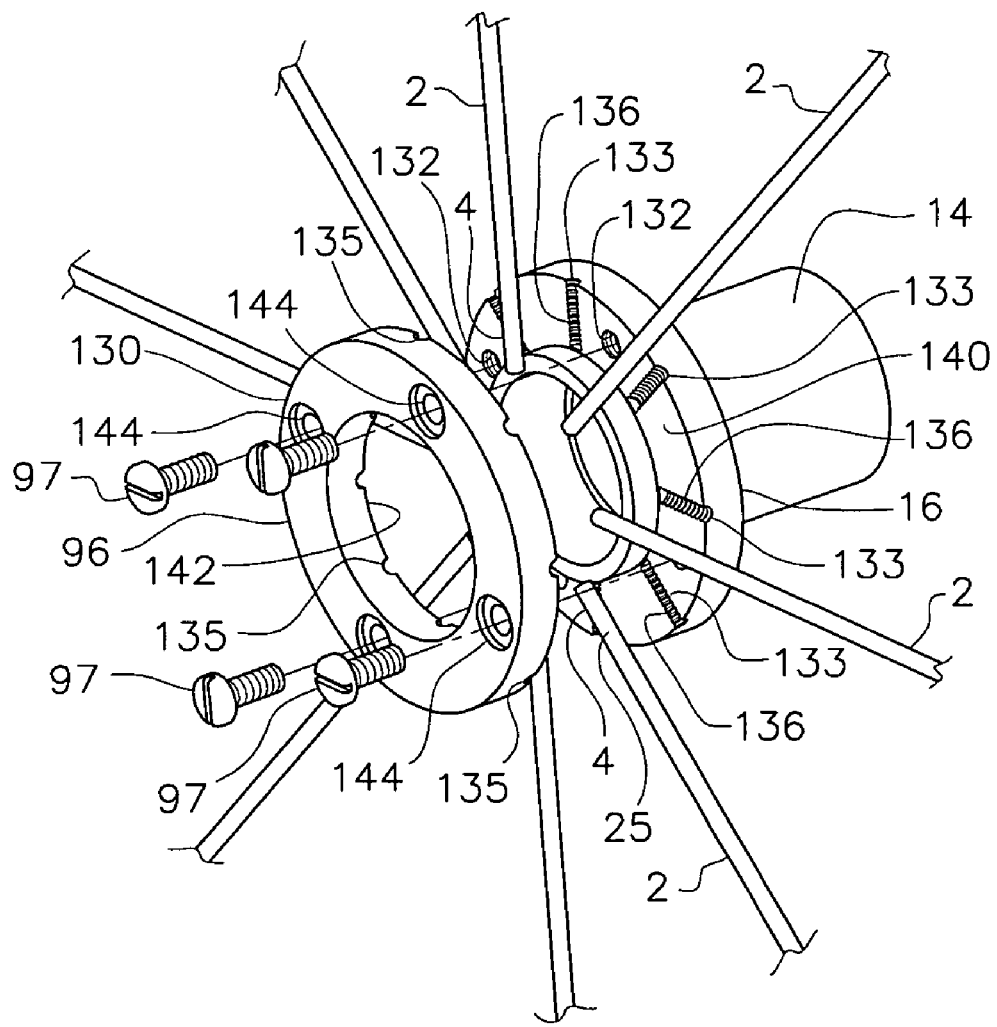
FIG. 4a is an exploded perspective view of a partial hub shell assembly of a second embodiment of the present invention, showing a cavity with a configured surface prior to assembly with the spoke, including a clamping member.
Figure 4B:
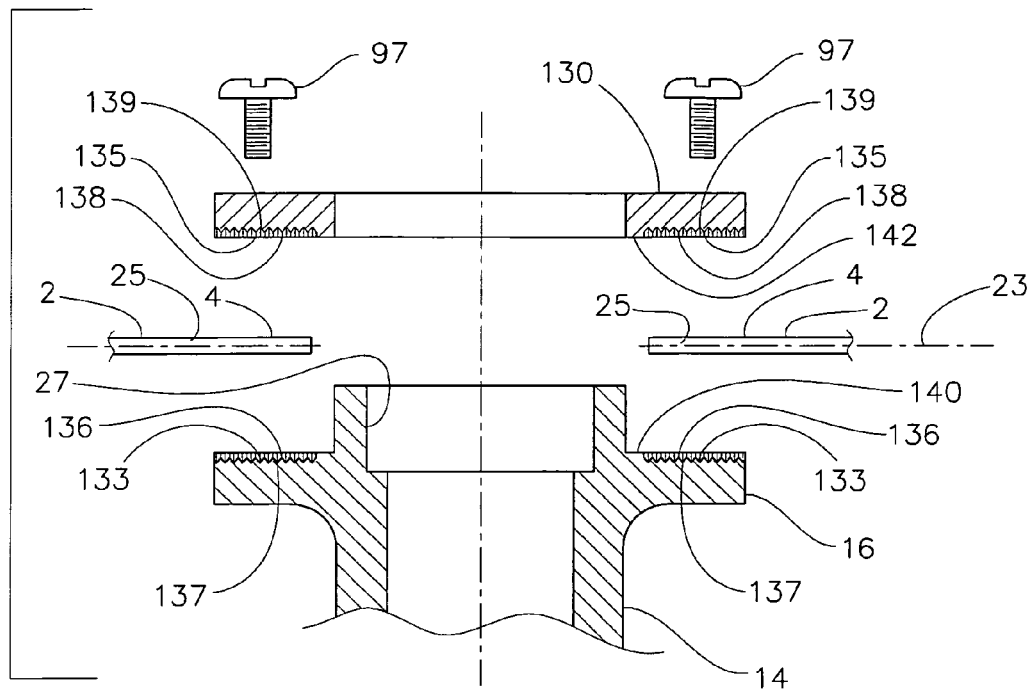
Figure 4C:
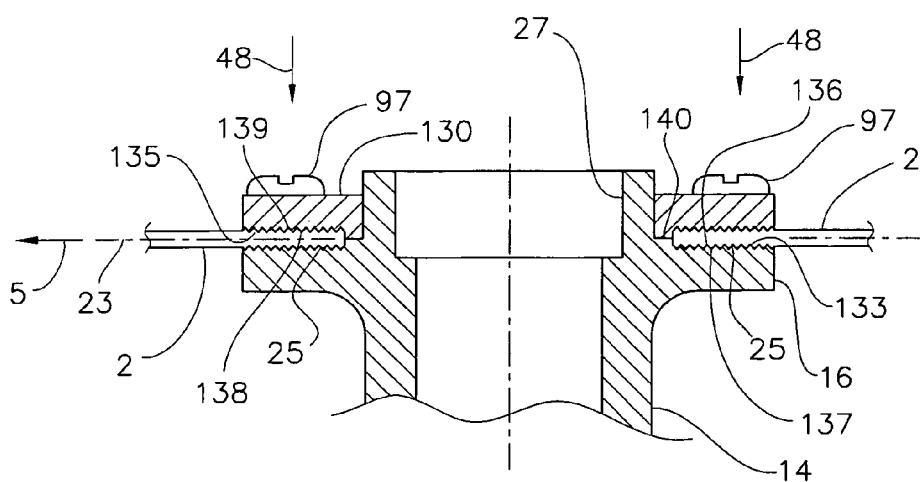

FIGS. 4a-c describes an alternate embodiment that in most respects is identical to the embodiment of FIGS. 3a-c, however this variant shows the embossed interaction of this clamped engagement of this embodiment as the opposite of that described in FIGS. 3a-c. In contrast to the embodiment of FIGS. 3a-c, where cavities 33 and 98 are embossed by the spoke 2, in the embodiment of FIGS. 4a-c the spoke 2 is instead embossed by cavities 133 and 135.

Hub shell 14 includes a hub flange 16 and a bearing bore 27 to facilitate mounting of a bearing (not shown) and axle (not shown). Hub flange 16 of hub shell 14 serves as both a clamping element and a bracing element and includes a series of open cavities 133 in its face 140, each with a configured surface defined by raised ribs 136 and relieved portions 137 therebetween as shown. Clamping member 130 likewise includes open cavities 135 in its face 142 that are aligned to be opposed to cavities 133 of the hub flange 16. Each cavity 135 includes a configured surface defined by raised ribs 138, with relieved portions 139 therebetween. The cavities 133 and 135 are shown to have curved sidewalls that are generally matched to the surface of the spoke 2. This allows the cavity to partially wrap around the spoke for greater surface contact between the spoke 2 and the cavities for a more effective interface therebetween. Hub flange 16 also includes internally threaded holes 132 for threadable assembly with screws 97. Spoke 2 includes outer surface 25.

Clamping member 130 serves to sandwich and clamp the spoke 2 between the hub flange 16 and the clamping member 130. Spoke 2 has a smooth end 4 and, as it is the embossed element, it is generally of softer material than the material of both the hub flange 16 and the clamping member 130. One candidate spoke material for this embodiment is a composite spoke 2 formed from polymer resin with longitudinal high-strength fiber reinforcement. While the candidate polymer resin may be of thermoplastic type or thermoset type, the thermoplastic type may have greater ductility and will therefore withstand the deformation without cracking. The hub flange 16 may be mad of a harder material, such as aluminum.

Upon assembly, spokes 2 are first positioned such that ends 4 are nested in their corresponding cavities 133. Clamping member 130 is then assembled to axially sandwich the ends 4 of spokes 2, which are also nested in their corresponding cavities 135. Screws 97 are passed through their corresponding clearance holes 144 and threadably assembled to their respective holes 132 of the hub flange 16. When the screw 97 is threadably tightened into hole 132, with its screw head pressed against the clamping member 130, the clamping member 130 is driven axially toward the hub flange 16 in a direction generally perpendicular to the sidewall of the spoke 2, to provide clamping force 48 to sandwich the ends 4 of spokes 2. The clamping force 48 is such that the raised ribs 136 and 138 emboss and deform the outside surface of the ends 4 of the spokes 2. A firm deformed engagement connection between the hub flange 16 and the spoke 2 is thus achieved. FIG. 4c shows the spoke 2 as clamped and engaged to the hub flange 16 and clamping member 130, with spoke 2 embossed to engage cavities 133 and 135. Since raised ribs 136 and 138 locally pinch the ends 4 of spokes 2, an overlying engagement is thus achieved with the cavities 133 and 135. Further, the ends 4 are also frictionally gripped by the cavities 133 and 135. The spoke 2 is now firmly anchored to the hub flange 16 and is capable of resisting spoke tension forces 5. The clamping member 130 is firmly engaged and retained to the hub flange 16 by the screws 97, which also serve to maintain their clamped connection with the spokes 2. It may be viewed that hub flange 16 and clamping member 130 may both be considered to be clamping elements that sandwich the spoke 2.

Figure 5:
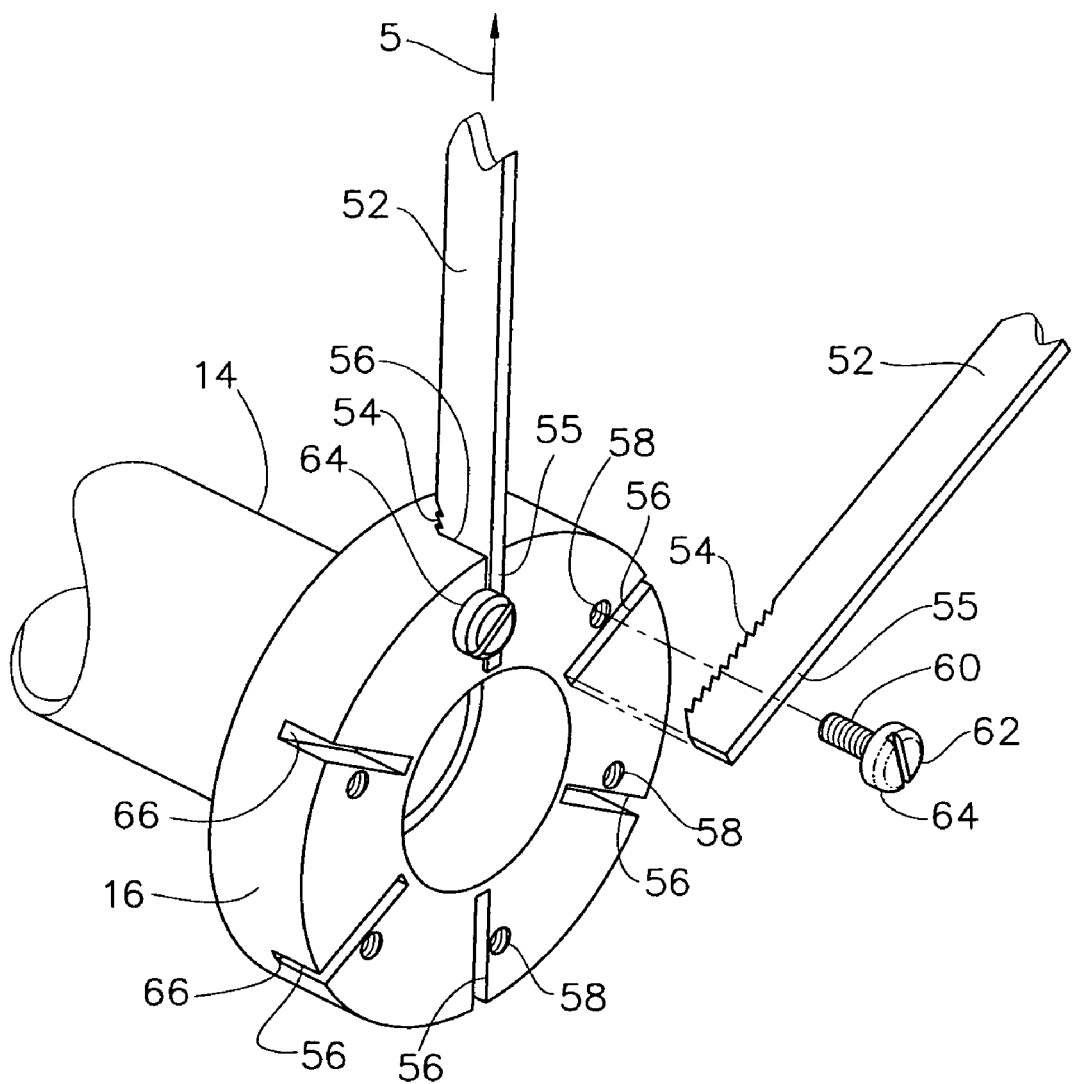
FIG. 5 is an exploded perspective view of a partial hub shell assembly of a third embodiment of the present invention, showing a spoke with configured edge surface prior to assembly with the hub flange, including a screw head clamping element.

The embodiment of FIG. 5 is similar to the embodiment of FIGS. 3a-c. However, while the spoke 2 of FIGS. 3a-c has two opposing embossed interfaces, the spoke 52 utilizes only a single embossed interface. Spoke 52 is of generally flat cross section, with a smooth edge portion 55 and a configured edge portion 54 in the form of a series of directionally raked sawtooth profile ribs. Screw 62 includes threaded portion 60 and head 64. Hub shell 14 includes flange 16, with a series of slots or open cavities 56, each with an enclosed sidewall portion 66, to accept the spokes 52. Hub flange 16 also includes a series of threaded holes 58 adjacent the cavity 56 to accept the threaded portion 60 of screws 62.

During assembly, spoke 52 is first positioned in cavity 56 such that the configured edge portion 54 is contacting the enclosed sidewall portion 66. Screw 62 is then threadably engaged with threaded hole 58 and tightened such that the underside of the head 64 bears against the smooth edge 55 of spoke 2. As the screw is further tightened, it presses the configured portion 54 to emboss the enclosed sidewall portion 66. The spoke 52 is thus engaged to the hub flange 16 at the embossed interface between the configured portion 54 and the enclosed sidewall portion 66 and clamped in place by the screw 62. The spoke 52 is now firmly anchored to the hub flange 16 and is capable of resisting spoke tension forces 5. The sawtooth rib profile of the configured portion 54 is a preferable profile because the raked angle provides good blocking engagement with the embossed sidewall portion 66 to resist spoke tension force 5.

The embodiment of FIGS. 6a-d is similar in many respects to the embodiment of FIGS. 4a-c in that the clamping elements serve to emboss the spoke. While the embodiment uses the screws 97 as a means to retain the clamping member 130 to the hub flange 16, the embodiment of FIGS. 6a-d uses retaining sleeve 152 to hold the gripping collars 154a and 154b in their gripped position with the spoke 2. Further, while the embodiment of FIGS. 4a-c provides attachment of a multiplicity of spokes within a single clamped connection between two elements (the clamping member 130 and the hub flange 16), the embodiment of FIGS. 6a-d provides attachment with only a single spoke 2.

FIG. 6a shows the components in exploded view prior to assembly. Sleeve 152 is a generally cylindrical element with an internal cavity 156. Collar 154a includes an external surface 157a and a cavity 158a that is lined with configured surface 160a that includes a series of raised and relieved surfaces as described herein above. Similarly, collar 154b includes an external surface 157b and a cavity 158b that is lined with configured surface 160b that includes a series of raised and relieved surfaces.

FIG. 6b describes the next step in the assembly process. Collars 154a and 154b are pressed in their respective directions 162a and 162b to sandwich the spoke 2 as shown. This causes the configured surfaces 160a and 160b of their respective cavities 158a and 158b to impinge and embed into the outside surface 25 to emboss the spoke 2. Next, sleeve 152 is assembled in direction 164, with internal cavity 156 closely fitted to the external surfaces 157a and 157b. With sleeve 152 in place surrounding and enclosing the collars 154a an 154b, as shown in FIGS. 6c-d, the internal cavity 156 restrains the collars 154a and 154b, holding them in their embossing position to grip the spoke 2. Thus, the sleeve may be viewed as a retaining element to maintain the connection between the collars 154a and 154b and the spoke 2. With the collars and/or the sleeve 152 overlying and bearing against the bracing element 78, the spoke 2 is firmly anchored to the bracing element 78 to resist spoke tension forces 5.

Figure 7E:
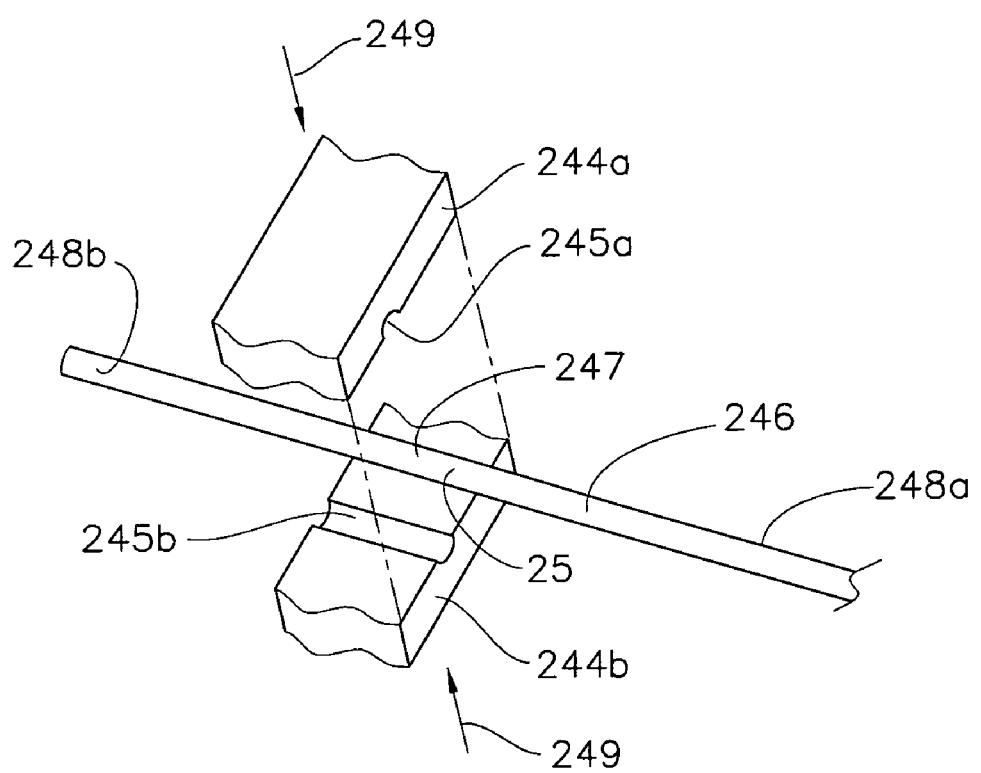
FIG. 7e is an exploded perspective view of a ninth embodiment of the present invention, showing a spoke connection prior to assembly, including a clamping element with a smooth cavity and a spoke with a smooth clamped surface.

FIGS. 7a-e describe a variety of embodiments similar to that described in FIGS. 3a-c, however these embodiments show a range of alternate clamping elements. In FIG. 7a, spoke 2 includes a configured surface 40 with a series of raised ribs and relieved portions therebetween. Clamping elements 202a and 202b are shown to have generally flat corresponding clamping surfaces 204a and 204b, both without a defined cavity to accept the spoke 2. Spoke 2 is first located such that configured surface 40 is between surfaces 204a and 204b. Next, clamping members 202a and 202b are brought toward each other to sandwich the spoke 2. As clamping elements 202a and 202b are forcibly pressed together, surfaces 204a and 204b are embossed by configured portion 40 and a firm connection is thus achieved between the spoke 2 and clamping elements 202a and 202b in a manner previously described.

FIG. 7b describes an embodiment similar to FIG. 7a, however in this case the clamping element 208a includes a cavity 210a that is similar to the embodiment of FIGS. 3a-c. Spoke 2 includes a configured surface 40 with a series of raised ribs and relieved portions therebetween. Clamping element 208a is shown to have a corresponding cavity 210a. The cavity is shown to have curved sidewalls that are generally matched to the configured surface 40 of the spoke 2. This allows the cavity to partially wrap around the spoke for greater surface contact between the spoke and the clamping element 208a for a more effective interface therebetween. Spoke 2 is first located such that configured surface 40 is located to rest in cavity 210a. Next, an additional clamping member (not shown) is brought toward clamping element 208a to sandwich the spoke 2. As these clamping elements forcibly pressed together, cavity 210a is embossed by configured portion 40 and a firm connection is thus achieved between the spoke 2 and clamping member 208a in a manner previously described.

FIG. 7c describes an embodiment similar to FIG. 7b, however in this case the cavity 214a includes a longitudinal raised rib 216a. Spoke 2 includes a configured surface 40 with a series of raised ribs and relieved portions therebetween. Clamping element 212a is shown to have a corresponding cavity 214a and raised rib 216a. Spoke 2 is first located such that configured surface 40 is located to rest in cavity 214a. Next, an additional clamping element (not shown) is brought toward clamping element 212a to sandwich the spoke 2. As these clamping elements are forcibly pressed together, raised rib 216a is embossed by configured portion 40 and a firm connection is thus achieved between the spoke 2 and clamping member 212a in a manner previously described. Raised rib 216a may be considered a "crush zone" that has reduced surface area and may be more easily deformed by the configured surface 40.

FIG. 7d describes an embodiment similar to FIG. 7b, however in this case the cavity 220a includes a series longitudinally spaced bumps 222. Spoke 2 includes a configured surface 40 with a series of longitudinally spaced raised ribs and relieved portions therebetween. Clamping element 218a is shown to have a corresponding cavity 220a and a series longitudinally spaced bumps 222. Raised bumps 222 are longitudinally spaced to correspond to the relieved portions of the configured surface 40. Spoke 2 is first located such that configured surface 40 is located to rest in cavity 218a, with raised bumps 222 nestled within relieved portions. Next, an additional clamping member (not shown) is brought toward clamping element 218a to sandwich the spoke 2. As these clamping elements forcibly pressed together, cavity 220a is embossed by configured portion 40, with raised bumps 222 providing additional interlocking and overlying engagement with the ribs of the configured surface 40. A firm connection is thus achieved between the spoke 2 and clamping member 218a in a manner previously described. While the cavity 220a is still embossed and deformed by the spoke, raised bumps 222 may be considered as additional configured geometry to allow the cavity 220a to more closely conform the configured surface 4 of the spoke 2, thereby optimizing the overlying engagement therebetween.

FIG. 7e describes an embodiment that is in many respects similar to the embodiment of FIG. 7b, however instead of having a configured surface, the spoke 246 is generally smooth in the clamped interface region. Clamping members 244a and 244b have their respective cavities 245a and 245b, each of which have two open ends. Spoke 246 extends beyond either side of the clamping members 244a and 244b and has a generally smooth surface at the clamped interface region 247. By locating the clamped interface region 247 at some midpoint along the length of the spoke 246, a duplex spoke may be created, which incorporates two structural spans 248a and 248b, with each span extending between two bracing elements. Thus, for example, the clamped interface region 247 may have a clamped connection at the hub flange (not shown), with a first span 244a extending to one point of the outer rim (not shown) and a second span 244b extending to another point in the outer rim.

As described previously, spoke 246 is nested and assembled to cavities 245a and 245b, with spoke 246 sandwiched between clamping members 244a and 244b. Clamping members 244a and 244b are pressed together with clamping force 249. Since the surfaces of cavities 245a and 245b are generally smooth, and the clamped interface region 247 is also smooth, the clamping forces 249 tend to grip the outside surface 25 of spoke 2 primarily through friction to resist spoke tension force. However, it should be noted that, even with smooth sides, the spoke 2 may be embossed or slightly shrunk by the clamping members 244a and 244b. This also serves to create a slight overlying engagement with their clamping members 244a and 244b to further augment resistance to spoke tension forces. Thus FIG. 7e illustrates an embodiment with a generally smooth clamped interface.

Figure 10:
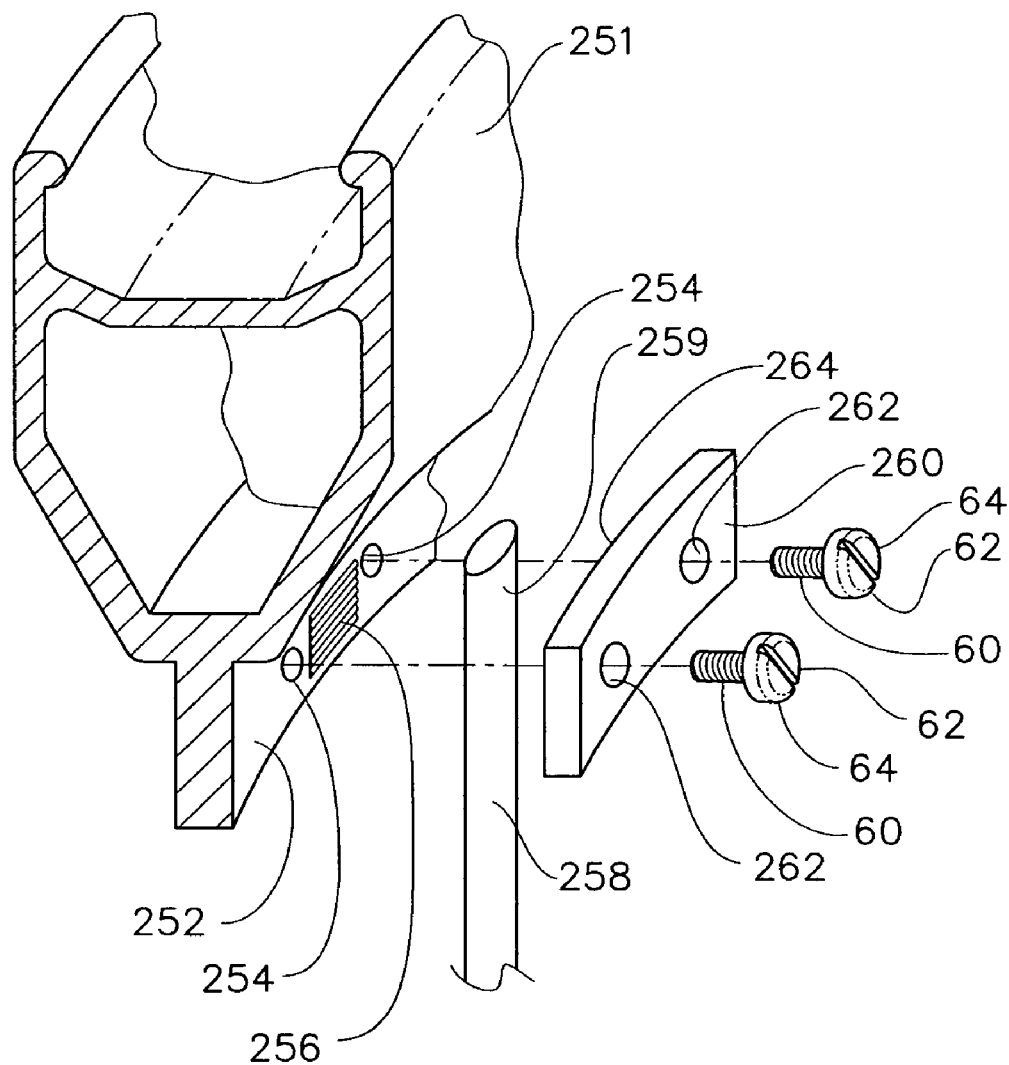
FIG. 10 is an exploded perspective view of an eleventh embodiment of the present invention, including a clamping member that is integral with an outer rim.

It should be understood that the features unique to the embodiments described in FIGS. 7a-d may be transposed between the clamping elements shown and their respective spoke. For example, in FIG. 7a, the clamping elements 202a and 202b may instead include a generally flat configured surface, for example as illustrated in FIG. 10, while the spoke 2 is generally smooth. Thus the surface of the spoke 2 may instead be embossed by the clamping element.

Figure 8A:
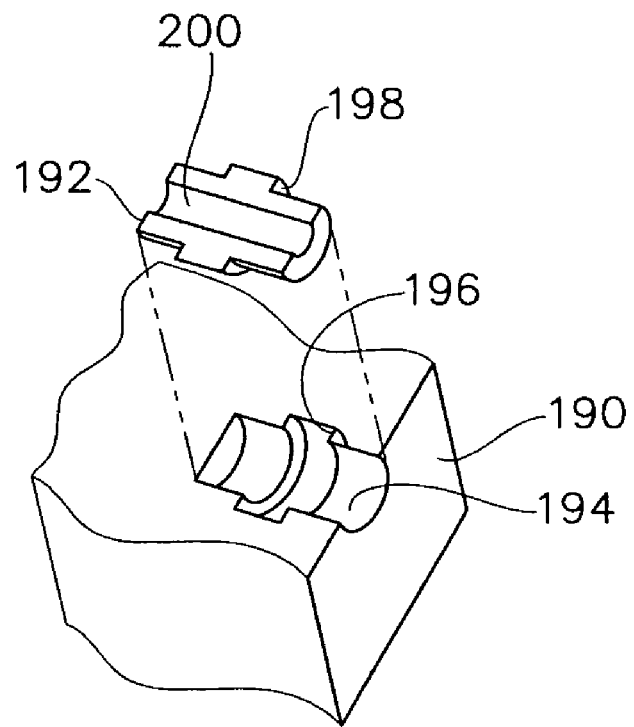
FIG. 8a is an exploded perspective view of a tenth embodiment of the present invention, including an insert prior to assembly with a pocket of the clamping element.
Figure 8B:
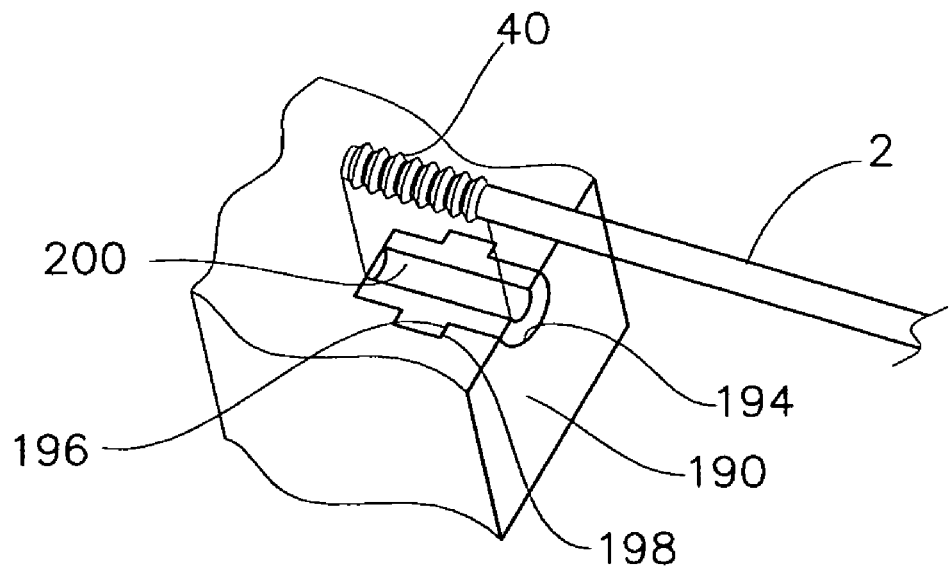
FIG. 8b is an exploded perspective view of the embodiment of FIG. 8a, showing the insert assembled to the pocket and the spoke prior to assembly with the insert.

FIGS. 8a-b describe an embodiment very similar to the embodiment of FIGS. 3a-c and FIG. 7b. However, it may be seen that clamping member 190 includes a malleable or deformable insert 192 for connection with the spoke 2. Spoke 2 includes a configured surface 40 with a series of longitudinally spaced raised ribs and relieved portions therebetween. Clamping element 190 includes pocket 194 and engagement surface 196. Insert 192 includes engagement surface 198 and cavity 200. As shown in FIG. 8a, the insert 192 is first assembled to the pocket 194, with cavity 200 exposed as shown in FIG. 8b. With engagement surface 196 located to provide overlying engagement to engagement surface 198, the pocket 194 is locked to the insert 192 in the direction of spoke tension forces (not shown). With insert 192 located in pocket 194, the spoke may be assembled to the deformable cavity 200. Next, an additional clamping member (not shown) is brought toward clamping element 190 to sandwich the spoke 2. As these clamping elements forcibly pressed together, cavity 200 is embossed by configured portion 40. A firm connection is thus achieved between the spoke 2 and clamping member 200 in a manner previously described. In an embodiment such as this, it may be seen that the clamping member 190 may be formed out of a wide range of materials that may not necessarily have particularly good deformability or malleability properties. However, with the addition of a deformable insert 192, the spoke connection of the present invention may still be achieved.

Figure 9A:
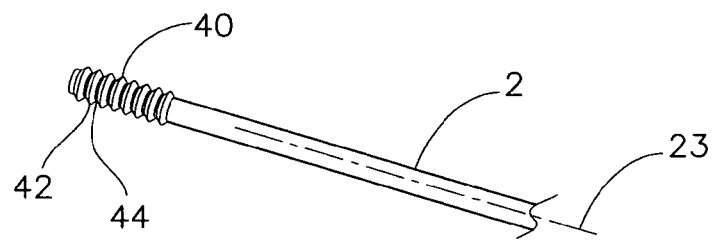
FIG. 9a is a perspective view of a spoke of the present invention, including a knurled surface for interface with the clamping element (not shown)
Figure 9B:
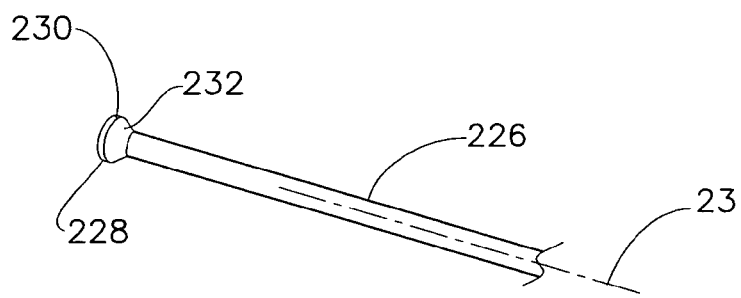
FIG. 9b is a perspective view of a spoke of the present invention, including an enlarged head for interface with the clamping element (not shown)
Figure 9C:
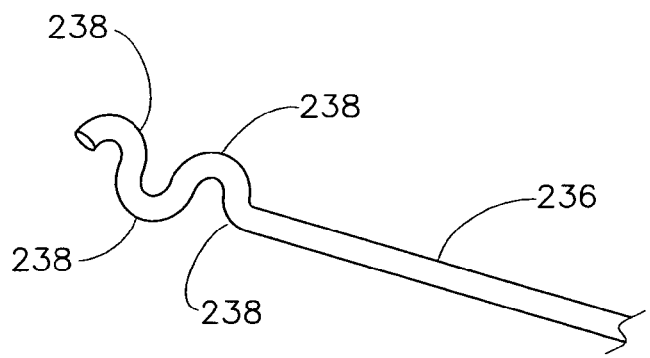
FIG. 9c is a perspective view of a spoke of the present invention, including bent portion for interface with the clamping element (not shown)

FIGS. 9a-c describe a variety of ways that the surface of the spoke may be configured to provide overlying engagement with the clamping element. FIG. 9a describes a spoke 2 that includes a configured surface 40 with a series of longitudinally spaced raised ribs 42 and series of relieved portions 44 therebetween. These raised ribs may be considered to be raised edges and these raised ribs also extend in a direction generally perpendicular to the longitudinal axis 23 of the spoke as shown. This was described in more detail in FIGS. 3a-c. It should be noted that the cross section geometry of the spoke is variable within the configured portion 40.

The spoke 226 of FIG. 9b is similar the spoke 2 of FIG. 9a, however the configured portion 228 includes an enlarged head 230 with a transition portion 232 between the spoke 226 and the enlarged head 230. In this respect, the configured portion 228 may be considered to be similar to the configured portion 40, however the configured portion 228 has only a single raised portion and a single relieved portion. This raised portion may be considered to be a raised edge, which extends in a direction generally perpendicular to the longitudinal axis 23 of the spoke as shown.

The spoke 236 of FIG. 9c has a configured portion constituting bent regions 238 as shown. Bent regions 238 include a series of "S"-shaped bends to create an overlying engagement with the clamping member (not shown) as previously described. It should be noted that the cross section geometry of the spoke is generally constant within the configured bent region 238.

Figure 9D:
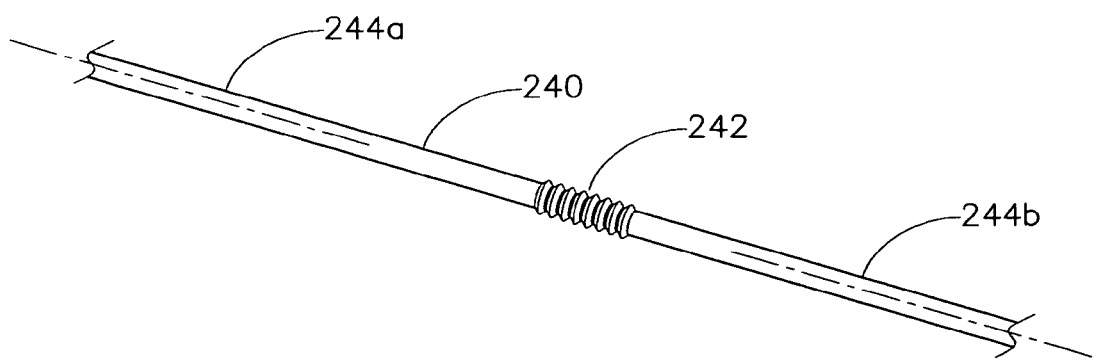
FIG. 9d is a perspective view of a duplex spoke of the present invention, including a knurled surface for interface with the clamping element (not shown) and a second span portion.

FIG. 9d describes a spoke 240 that includes a configured surface 242 located at a midpoint along spoke, as opposed to the end of the spoke as previously described. By locating the configured portion 242 at some midpoint along the length of the spoke 242, a duplex spoke may be created, which incorporates two structural spans 244a and 244b, with each span extending between two bracing elements. Thus, the configured portion 242 may be clamped at the hub flange (not shown), with a first span 244a extending to one point of the outer rim (not shown) and a second span 244b extending to another point in the outer rim.

While the embodiments of FIGS. 3a-c and 4a-c and 5 all show how a clamping element may be integral with the hub flange, the embodiment of FIG. 10 illustrates that a clamping member may alternatively be integral with the outer rim hoop 251 as well. Rim hoop 251 is shown in radial cross section and is of generally conventional "double-wall" configuration, however it also includes a radially extending tab portion 252. Tab portion 252 includes threaded holes 254 and a generally flat knurled face 256. Clamping member 260 includes clamping surface 264 and clearance holes 262 that are aligned with threaded holes 254. Spoke 258 includes outer surface 259 and is of slightly flattened cross section as shown and is positioned between clamping surface 264 and face 256. Screw 62 includes threaded portion 60 and head 64.

The spoke 258 is first sandwiched between face 256 and clamping surface 264. The threaded portions 60 of the two screws 62 are first passed through their respective clearance holes 262 and then threadably assembles within their respective threaded holes 254. By threadably tightening the screws 62, the clamping member 260 is pressed toward the tab portion 252 to squeeze and grip the spoke 258 between clamping surface 264 and face 256. In this exemplary embodiment, the outer surface 259 of spoke 258 is of a generally softer material (such as fiber-reinforced polymer) and the face 256 is of a harder material (such as aluminum) relative to the outer surface 259 such that the flat knurled face 256 embosses spoke 258. A firmly anchored connection between the spoke 258 and rim 251 is thus achieved.

While my above description contains many specificities, these should not be construed as limitations on the scope of the invention, but rather as exemplifications of embodiments thereof. For example:

The embodiments described herein envision two clamping elements that clamp the spoke from opposite sides that are essentially 180 degrees apart. It is also envisioned that alternate embodiments may utilize three or more clamping elements to clamp the spoke. Further, these clamping elements may apply clamping force from a wide range angles to grip the spoke. For example, an embodiment may utilize three clamping elements that apply clamping force in three different directions, spaced 120 degrees apart.

Further, the embodiments described herein utilize a clamping force that is in a direction generally perpendicular to spoke tensile forces. However, it is also envisioned that the clamping force may be at some other angle relative to the spoke tensile force. For example, the spoke may be bent such that its longitudinal axis will deviate from the spoke tensile axis by some angle, say 30 degrees for example, in a region outside its span portion. If the spoke were clamped in this region outside its span, then the clamping force would generally be applied in a direction that is 60 degrees from the tensile axis of the spoke. Further, while a clamping force that is perpendicular to the longitudinal axis of the spoke is often most preferable, a range of other clamping angles is certainly feasible.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

Thus, the present invention provides a vehicle wheel that is inexpensive to produce, lends itself easily to high-volume manufacturing methods, is light in weight and is strong and reliable. Further, the present invention reduces the amount of labor required to assemble the wheel. Further still, the present invention reduces component cost through the use of lower-cost materials, by reducing the tolerances and number of forming operations required in spoke manufacture, and by utilizing net-shape hub forming operations to reduce scrap and fabrication expense. Further still, the present invention reduces wheel weight by facilitating the utilization of light weight hub materials, by allowing greater freedom in hub flange detail and geometry to optimize the design, by facilitating the use of multi-filament spokes, and by facilitating hybrid hub shell construction where high-strength materials are used only where necessary. Yet further, the present invention increases the strength and reliability of the wheel by reducing stresses in components and connections, by eliminating any clearances or relative movement between the hub and spokes, and by eliminating any unsupported bends in the spokes.

What is claimed is:

1. A wheel, comprising: a peripheral wheel rim;
a central hub with a central axle and an outer flange;
a plurality of spokes extending between the rim and hub,
a bracing element connected to at least one of said spokes;
a clamping element connected to said bracing element;
wherein said spokes have a first portion connected to said rim and a second portion opposed to said first portion and connected to said hub and a span portion between said rim and said hub;
wherein said spoke has a tensile axis of applied tensile load along said span portion and wherein said spoke has a sidewall surface and a longitudinal axis along the length of said spoke;
wherein said bracing element includes at least a portion of at least one of said rim and hub;
wherein said spoke is anchored to said clamping element in a clamped connection, such that said clamping element is clamped to at least one of said spokes by a clamping force at a clamped interface between said spoke and said clamping element; and
wherein at least one of said first portion and said second portion of at least one of said spokes is joined to said clamping element by means of a deformed engagement at said clamped interface, such that at least one of (1)

said clamping element is deformed by said spoke and (2) said spoke is deformed by said clamping element.

2. A wheel according to claim 1, wherein said clamped connection constitutes a sandwiched clamped connection, including at least two clamping elements arranged to sandwich and grip a portion of said spoke therebetween.

3. A wheel according to claim 1, including a deformed engagement between said spoke and said clamping element, wherein at least one of (1) said spoke includes a configured surface and wherein said clamping element is embossed by said configured surface of said spoke due to clamping force and (2) said clamping element includes a configured surface and wherein said spoke is embossed by said configured surface of said clamping element by said clamping force.

4. A wheel according to claim 3, wherein said configured surface includes a raised edge.

5. A wheel according to claim 4, wherein said raised edge extends in a direction generally perpendicular to said longitudinal axis of said spoke.

6. A wheel according to claim 3, wherein said configured surface includes a bent portion.

7. A wheel according to claim 1, wherein said deformed engagement includes plastic deformation at the clamped interface of at least one of said spoke and said clamping element.

8. A wheel according to claim 1, wherein said clamping force is applied in a direction generally perpendicular to said sidewall surface of said spoke.

9. A wheel according to claim 1, wherein said clamping element includes a cavity to accept said spoke therein.

10. A wheel according to claim 9, wherein at least a portion of said cavity includes a surface matched to the surface of said spoke.

11. A wheel according to claim 9, wherein at least one of said first portion and said second portion of at least one of said spokes is joined to said cavity by means of a deformed engagement, such that at least one of (1) said cavity is deformed by said spoke and (2) said spoke is deformed by said cavity.

12. A wheel according to claim 2, wherein at least one of said clamping elements is integral with said bracing element.

13. A wheel according to claim 1, wherein said clamped connection provides connection with a singular spoke.

14. A wheel according to claim 1, wherein said clamped connection provides connection with a multiplicity of said spokes.

15. A wheel according to claim 1, wherein said clamped connection is a dis-assemblable clamped connection wherein said clamped connection may be disassembled and re-assembled.

16. A wheel according to claim 1, wherein said clamping force is provided by threadably tightening a threaded engagement.

17. A wheel according to claim 1, wherein said clamping force is maintained by a retaining means to retain said clamping element in its clamped position.

18. A wheel according to claim 17, wherein said retaining means is a retaining sleeve.

19. A wheel according to claim 17, wherein said retaining means is a threaded fastener.

20. A wheel according to claim 1, including a longitudinal engagement between said spoke and said clamping element.

21. A wheel according to claim 20, wherein said longitudinal engagement constitutes at least two engagement interface locations that are longitudinally spaced along the longitudinal axis of the spoke.

22. A wheel according to claim 20, wherein said longitudinal engagement constitutes continuous longitudinal engagement interface along the longitudinal axis of the spoke.

23. A wheel according to claim 1, wherein at least a portion of said spoke includes polymeric resin with reinforcement fibers.

24. A wheel according to claim 1, wherein at least a portion of said clamping element includes polymeric resin.

25. A wheel according to claim 4-9, wherein at least a portion of said cavity includes polymeric resin.

26. A wheel according to claim 1, wherein said spoke is a duplex spoke, including two span portions and a common portion therebetween, wherein said clamped interface is at said common portion.

27. A wheel according to claim 1, wherein said clamping element includes a raised crush zone for contact with said spoke at said clamped interface.

28. A wheel according to claim 1, wherein said clamping element includes a multiplicity raised surface portions for contact with said spoke at said clamped interface.

29. A wheel according to claim 1, including an insert connected to said clamping element, wherein at least a portion of said clamped interface occurs at said insert.

30. A wheel according to claim 1, wherein said deformed engagement includes elastic deformation at the clamped interface of at least one of said spoke and said clamping element.

31. A wheel according to claim 3, wherein said configured surface includes a region of variable cross section geometry where said cross section geometry is variable as compared between two longitudinally spaced locations along said longitudinal axis.

32. A wheel according to claim 20, wherein said deformed engagement includes a multiplicity of longitudinally spaced deformed engagement points along said longitudinal axis.

* * * * *